May 14, 1929.  F. A. BYLES  1,713,168
ELECTRIC REGULATOR
Filed Sept. 9, 1926
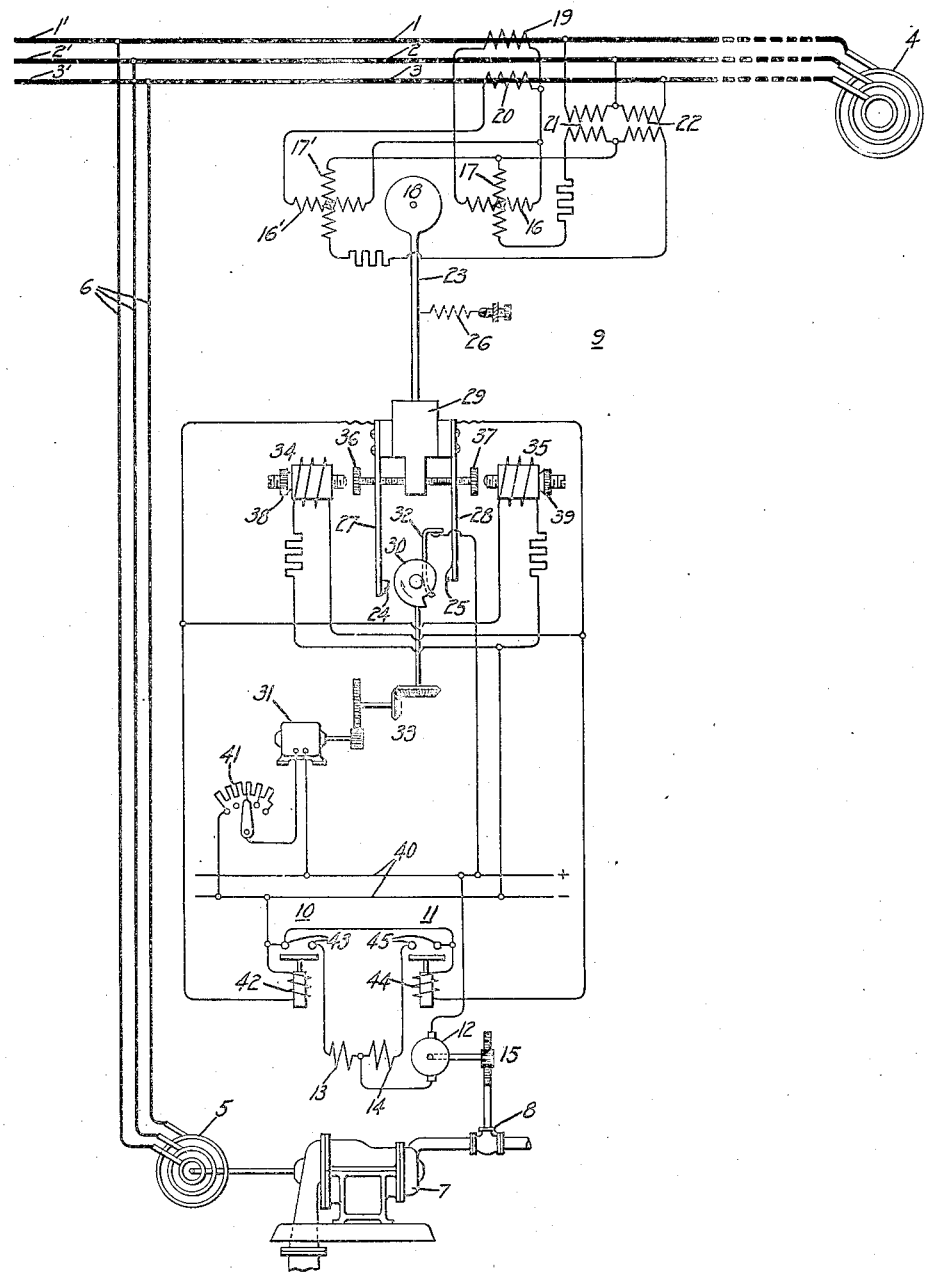
Inventor:
Frank A. Byles,
by [signature]
His Attorney.

Patented May 14, 1929.

1,713,168

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

ELECTRIC REGULATOR.

Application filed September 9, 1926. Serial No. 134,538.

My invention relates to electric regulation, and more particularly to regulating arrangements of the type embodying contact-making devices. My invention finds particular application in systems of distribution in which it is desired to regulate the power delivered to a load circuit by a particular generator or by a particular supply circuit, but is also adapted for use in systems or circuits in which it is desired to maintain some electrical characteristic such as the voltage, current, power, or power factor, of the system or circuit at a predetermined or constant value.

One object of my invention is to provide an improved regulator of the contact-making type which is equally sensitive to small or large variations in an electrical characteristic of a circuit which is to be regulated and which is substantially free from hunting.

Another object of my invention is to provide an improved arrangement for insuring firm, positive contact of the regulator contacts, without impairing the ability of the regulator to assume periodically a new position for any degree of change in the electrical characteristic which is being regulated.

My invention will be better understood from the following description taken in connection with the accompanying diagrammatic drawing, and its scope will be pointed out in the appended claims.

For purposes of explanation I have shown an embodiment of my invention in a load regulating system and the single figure illustrates diagrammatically a system wherein the power supplied by a main source of supply is maintained substantially constant by regulating the power output of an auxiliary source of supply operating in conjunction therewith to supply a common load circuit.

Referring to the drawing, a supply circuit comprising conductors 1, 2, and 3, is provided with a main source of supply comprising a generator 4, and an auxiliary source of supply comprising a generator 5 which is connected to the supply circuit by conductors 6. These generators are arranged to supply power to a common load circuit comprising conductors 1', 2' and 3'. The generator 4 is operated by any suitable means (not shown), and the generator 5 is operated by any suitable means such, for example, as a steam turbine 7. The steam turbine 7 is controlled by means of a throttle valve 8. The means for regulating the load on generator 4 comprises a main control element 9, electro-responsive devices such as the electromagnetically operated switches 10 and 11, and a motor 12. The motor 12 is provided with a field winding 13 which when energized is arranged to produce rotation of the motor armature in one direction, and a field winding 14 which when energized is arranged to produce rotation in the opposite direction. The motor 12 is connected to the valve 8 by suitable gearing 15. When motor 12 is rotated in one direction the fluid energy transmitted to the turbine 7 is increased so as to increase the power output of the auxiliary generator 5, and when operated in the opposite direction the fluid energy transmitted to the prime mover is decreased so as to decrease the power output of the auxiliary generator 5.

The main control element 9 comprises a power responsive device which is illustrated in the form of a polyphase induction-type wattmeter having two sets of currents elements 16 and 16' and two sets of potential elements 17 and 17' acting on a common movable disc 18. The power responsive device is not restricted in any respect to any particular type and may be of the well known electrodynamometer type, or moving-coil type, of wattmeter in which the current coils are fixed and the voltage coils are mounted on a movable shaft and placed between the current coils. The current coils 16, 16' are connected to be energized in accordance with the current flowing in the supply circuit comprising conductors 1, 2 and 3, and are connected to the supply circuit by means of current transformers 19 and 20. The potential coils 17 and 17' are connected across the supply conductors 1 and 2, and 2 and 3, respectively, by means of potential transformers 21 and 22. The movable element 18 of the wattmeter is arranged to control the position of the contact members of the regulator 9 and as shown is directly connected to an arm 23 which supports contact members 24 and 25. An adjustable spring 26 is connected to the arm 23 and arranged in such a manner as to exert a force opposite to the force tending to turn the movable element 18 towards its maximum indicating position. This provides a means for adjusting the position of equilibrium of the movable element for different operating conditions. The contact members 24 and 25 are mounted on resilient conducting arms 27 and 28, respectively, which are positioned on opposite sides of an insulating member 29 carried by the movable arm 23. A cam-shaped contact member shown as a spiral-shaped cam 30 is interposed between the contacts 24 and 25 and is arranged to have its highest point in a non-engaging position when the movable element 18 is in its position of equilibrium which as shown is the vertical position of the contact arms 27 and 28. The contacts 24 and 25 are arranged so that only one can make contact with the contact member 30 for any variation in the position of the movable element 18 from its position of equilibrium.

The contact member 30 is arranged to be rotated by any suitable means such as the motor 31 and is continuously connected to one terminal of the control circuit by means of a brush 32. The rotation of contact member 30 periodically interrupts contact between the regulator contacts when either contact 24 or contact 25 assumes a contact engaging position. This produces intermittent energization of the control circuit to motor 12 and produces a notching effect to prevent overshooting of the regulated characteristic and consequent hunting action. It is usually desirable to rotate the contact member 30 at a comparatively slow speed which is slower than the normal speed of the usual commercial type of motor and hence motor 31 is connected to rotate contact 30 through suitable reduction gearing 33.

It will be observed that when contact is made on any part of the surface of contact member 30, contact will be continued for a certain period with an ever increasing tendency to move the arms 27 and 28 to a position of equilibrium just before the contact is broken. Hence this arrangement tends to eliminate any inherent friction in the meter device and places the movable elements of the meter in such a position that if the proper correction has been made a slight variation of the regulated characteristic thereafter is effective to cause engagement of the proper contacts immediately.

In addition to the above contact arrangement, means are porvided to increase the contact pressure between the contact members independently of the contact pressure due to the position taken by the movable arm 23. For this purpose the electromagnets 34 and 35 are arranged in operative relation with the contact arms 27 and 28 so that when either contact 24 or 25 makes contact with the rotating contact member 30 the contact pressure is increased. As shown iron or steel members 36 and 37 are threaded and inserted through arms 27 and 28, respectively, and are extended to abut against the insulating member 29. These members 36 and 37 serve as armatures for the electromagnets 34 and 35, and the screw threads on the members serve as a means to adjust the position of the contacts 24 and 25 with respect to the rotating contact member 30. The electromagnets 34 and 35 are placed opposite the armatures 36 and 37, respectively. When the electromagnet 34 is energized the pull of this electromagnet on its armature 36 moves the contact arms to the left and increases the contact pressure between contact members 25 and 30. In a similar manner when electromagnet 35 is energized the pull of this electromagnet on its armature 37 moves the contact arms to the right and increases the contact pressure between contact members 24 and 30. It will, of course, be apparent that the location of the electromagnets will depend upon the particular structure and arrangement of the contacts 24 and 25. The cores of the electromagnets are provided with means for adjusting the operating gap between the core of the electromagnet and its armature in order to determine the contact pressure between the contact members, and as shown comprises adjusting units 38 and 39 cooperating with a screw threaded portion of the cores of the electromagnets 34 and 35 respectively.

The electromagnets 34 and 35 are arranged to be energized from any convenient source and as shown are connected to be energized from a direct current bus 40 when contacts 24 or 25 engage contact member 30. The bus 40 also serves as a source of energization for the motor 31 which is connected thereto through a resistance 41 which diagrammatically represents a means for adjusting the speed of the motor and consequently the speed of rotation of contact member 30. The motor 12 is arranged to be energized from bus 40 through switches 10 and 11. Switch 10 comprises an operating coil 42 and contacts 43 and is arranged to be energized from bus 40 to close its contacts when contact 24 engages contact 30. When contacts 43 are closed a circuit is completed from bus 40 to energize motor 12 and its field winding 13 to actuate valve 8 in one direction. Switch 11 comprises an operating coil 44 and contacts 45 and is arranged to be energized from bus 40 to close its contacts when contact 25 engages contact 30. When contacts 45 are closed, a circuit is completed from bus 40 to energize motor 12 and its field winding 14 to actuate valve 8 in a direction opposite to the direction of rotation previously obtained.

In the arrangement shown let it be assumed that generator 4 is in operation and supplying a predetermined amount of energy to the load circuit comprising conductors 1', 2' and 3'. Furthermore assume that prime mover 7 is operating generator 5 to supply an additional amount of energy which is a fraction of its full load capacity so that the generators together supply the normal load demand. If the energy supplied by generator 4 under the conditions outlined is the amount which is to be maintained constant, then the movable element 18 of the regulator is adjusted by means of spring 26 to assume a position of equilibrium which in the arrangement shown is such a position that the contact arms 27 and 28 take a vertical position so that contacts 24 and 25 are out of engagement with their cooperating contact member 30. The motor 31 is assumed to be in operation and rotating contact member 30. In case the load demand upon the supply circuit comprising conductors 1, 2 and 3 and the generator 4 increases the equilibrium of the power responsive device is disturbed, and the contact arms 27 and 28 are moved toward the left. Contact 25 will then engage contact 30. When contacts 25 and 30 close a circuit is completed from the positive side of the supply bus 40, through brush 32 contact 30, contact 25, operating coil 44 of switch 11, to the negative side of the bus 40. Simultaneously with the engagement of contacts 25 and 30 an energizing circuit is completed for the electromagnet 34 which cooperates with its armature 36 to increase the pull to the left and thereby increase the contact pressure between contacts 25 and 30 to insure firm, positive contact. When operating coil 44 is energized contacts 45 close and complete a circuit from the bus 40 for motor 12 and its field winding 14. Under these conditions motor 12 is arranged to rotate in a direction to open throttle valve 8 and thereby increases the power output from the auxiliary generator 5.

If it be assumed that contact 25 engages contact 30 in the position shown the energizing circuit for switch 11 will be completed until the high point of the cam is passed. During the engagement of the contacts, contact 25 is being continually urged to the right with an ever increasing distance from the cam center toward its non-engaging position. When the break occurs the electromagnet 34 is immediately deenergized to allow the meter element and consequently contact 24 or 25 to take up a new position depending upon the amount of load change which has been brought about in the load circuit.

A similar cycle of operations, the details of which will be apparent from the previous description, will take place if the load demand decreases and contact 24 engages contact 30. In this case the electromagnet 35 is energized to increase the contact pressure between contacts 24 and 30, and switch 10 is energized to close contacts 43 to complete an energizing circuit for motor 12 and its field winding 13. Motor 12 will then rotate in a direction opposite to its previous direction of rotation and will move valve 8 to decrease the load carried by auxiliary generator 5.

It will thus be seen from the foregoing description that the energization of the control circuit occurs periodically to effect correction in steps, and that the length of the period of contact will depend upon the speed at which contact 30 is rotated. Thus, if the load supplied is of a rapidly fluctuating nature it will probably be desirable to have contact 30 rotate at a higher rate of speed than if the load increases or decreases gradually.

While I have shown and described a particular embodiment of my invention it will be apparent to those skilled in the art that changes and modifications may be made without departing from my invention, and I, therefore, aim in the appended claims to cover all such changes and modifications as fall within the true spirit and scope of my invention.

What I claim as new, and desire to secure by Letters Patent of the United States, is:

1. An electrical regulator comprising cooperating contact members, means for imparting a rotary motion to one of said members and for periodically interrupting engagement between said contact members when said members occupy a predetermined position, means for varying the relative position of said members, and means for increasing the contact pressure between said members upon engagement thereof independently of the pressure due to their relative position.

2. An electrical regulator comprising cooperating contact members, one of said members being constructed and arranged to vary continuously the position of its contact surface with respect to the other of said contact members, means for varying the position of the other of said contact members, and means for increasing the contact pressure between said members independently of the pressure due to their relative position.

3. An electrical regulator comprising cooperating contact members, means for imparting a rotary motion to one of said members, said member having a cam-shaped contact surface, electrical means for varying the position of the other of said contact members with respect to said rotary member, and means for increasing the contact pressure between said members upon engagement thereof independently of the pressure due to their relative position.

4. An electrical regulator comprising a plurality of contact members, one of which is cam-shaped and positioned intermediate the other contact members, means for rotating said cam-shaped member, means for moving the other of said contacts to and from said cam-shaped member, and means for increasing the contact pressure between said members upon engagement thereof independently of the pressure due to their relative position.

5. In an electrical regulator, a contact member adjustable in position, a rotatable member having a contact surface arranged to cooperate with said adjustable contact member and adapted for periodically interrupting contact between said members when said first mentioned member occupies a contact-engaging position, and means for increasing the contact pressure between said contact members upon engagement thereof independently of the pressure due to their relative position.

6. In an electrical regulator, a contact member, electrical means for adjusting the position of said contact member, a cam-shaped contact member arranged to cooperate with said adjustable contact member, means for rotating said cam-shaped member for periodically disengaging said contact members when said first mentioned member occupies a contact-engaging position, and means for increasing the contact pressure between said members upon engagement thereof independently of the pressure due to their relative position.

7. The combination with an electrical circuit, of a regulator comprising cooperating contact members, one of which is cam-shaped, means for varying the relative position of said contact members in accordance with an electrical characteristic of said circuit, means for rotating said cam-shaped member for periodically disengaging said contacts independently of the value of said electrical characteristic, and electroresponsive means operative when said contact members are in engagement for increasing the contact pressure between said members.

8. In combination, an electrical circuit, a source of electrical energy connected thereto, and means responsive to an electrical characteristic of said circuit for controlling the energy supplied to said circuit by said source, said means comprising a regulator having a pair of contact members cooperating with a rotatable contact member for causing a step-by-step adjustment of said source, and means operative when said contact members are in engagement for increasing the contact pressure therebetween.

9. In combination, an electrical circuit, a main source of supply therefor, an auxiliary source of supply operating in conjunction with said main source for supplying power to said circuit, means independent of said main source of supply for actuating said auxiliary source, means responsive to the power delivered by said main source for controlling the power output of said auxiliary source, said power-responsive means comprising a regulator having a plurality of contact members, one of which is a rotatable cam-shaped member for periodically disengaging said contact members when said members are in contact-engaging position independently of the power delivered by the said main source.

10. In combination, an electrical circuit, a main source of supply connected to said circuit, an auxiliary source of supply arranged for operating in conjunction with said main source for supplying power to said circuit, a power-responsive device connected to be responsive to the power delivered to said circuit by said main source, a pair of spaced contacts, said power-responsive device being provided with a movable element for varying the position of said pair of spaced contacts in accordance with variations in power delivered by said main source, a cam-shaped contact member interposed between said spaced contacts, means for rotating said cam-shaped member, and electroresponsive means effective upon the engagement of said contact members for controlling the power delivered to said circuit by said auxiliary source.

11. In combination, an electrical circuit, a main source of supply connected to said circuit, an auxiliary source of supply arranged for operating in conjunction with said main source for supplying power to said circuit, a prime mover for said auxiliary source of supply, means for controlling the power input to said prime mover, a wattmeter connected to be responsive to the power delivered to said circuit by said main source, said wattmeter being provided with a movable element having spaced contacts thereon, a cam-shaped contact member interposed between said spaced contacts, means for rotating said cam-shaped member, electrical means operative when said contact members are in a contact-engaging position for increasing the contact pressure between said contact members, and electro-responsive means operative when said contacts are in engagement for controlling said prime mover controlling means.

In witness whereof, I have hereunto set my hand this 8th day of September, 1926.

FRANK A. BYLES.